United States Patent [19]

Walker

[11] 4,291,890
[45] Sep. 29, 1981

[54] VALVE SEAL WITH O-RING AND BACKUP RING

[75] Inventor: James V. Walker, Redondo Beach, Calif.

[73] Assignee: McDonnell Douglas Corporation, Long Beach, Calif.

[21] Appl. No.: 85,107

[22] Filed: Oct. 15, 1979

[51] Int. Cl.³ ............................................. F16J 15/18
[52] U.S. Cl. ................................. 277/165; 277/171; 277/176; 277/177; 277/188 A
[58] Field of Search ....... 277/188 A, 188 R, 170–172, 277/176, 177, 152, 165

[56] References Cited

U.S. PATENT DOCUMENTS

| | | |
|---|---|---|
| 2,349,170 | 5/1944 | Jackman . |
| 2,420,104 | 5/1947 | Smith .......................... 277/188 A X |
| 2,427,787 | 9/1947 | Hunter . |
| 2,437,814 | 3/1948 | Hallen . |
| 2,456,356 | 12/1948 | Aber . |
| 2,462,586 | 2/1949 | Whittingham . |
| 2,747,954 | 5/1956 | Damm et al. . |
| 2,749,193 | 6/1956 | Traub . |
| 3,269,737 | 8/1966 | Freese ............................ 277/177 X |
| 3,455,566 | 7/1969 | Hull et al. . |
| 3,968,971 | 7/1976 | Mariaulle ........................... 277/177 |

FOREIGN PATENT DOCUMENTS

| | | |
|---|---|---|
| 2011019 | 9/1970 | Fed. Rep. of Germany ... 277/188 R |
| 89125 | 4/1937 | Sweden ........................... 277/188 A |

*Primary Examiner*—Robert S. Ward, Jr.
*Attorney, Agent, or Firm*—John P. Scholl; George W. Finch; Donald L. Royer

[57] ABSTRACT

A seal structure for use in high pressure pneumatic or hydraulic fluid actuators. A solid toroidal shaped elastomeric O-ring and a solid toroidal shaped backup ring are emplaced in a specially configured circumferential groove on an internal sleeve. A conical shaped ramp in the groove bottom permits the use of a solid backup ring with a larger internal diameter for ease of installation over intervening lands on the sleeve without distortion of the backup ring beyond its elastic limit. The difference in the sizes of the symmetrical O-ring and backup rings assist in their proper installation on the sleeve.

12 Claims, 3 Drawing Figures

VALVE SEAL WITH O-RING AND BACKUP RING

BACKGROUND OF THE PRESENT INVENTION

The present invention relates to hydraulic or pneumatic seals. Small lightweight efficient hydraulic components are needed in many applications in the aerospace industry. These components require long lasting, reliable, easy to assemble high pressure seals which take up a minimum of space within the component. In prior art seals to prevent leakage between a cylindrical sleeve and a surrounding valve body an elastomeric O-ring is normally located in a circumferential groove in the sleeve with a backup ring located on one or both sides of the elastomeric O-ring. These wear-resistant backup rings are made with material having a low coefficient of friction such as polytetrafluoroethylene (Teflon). Some rings are pure Teflon and other rings are made of Teflon filled material. They protect the O-ring and prevent it from being extruded into the annular gap between the sleeve and the valve body when high pressure is placed on the seal.

The backup rings, sometimes termed as antiextrusion devices may have cross-sectional shapes in the form of triangles (U.S. Pat. No. 3,455,566). Prior patents also disclose rectangular cross-sectional shapes as well as rectangles with one curved side facing toward or away from the elastomeric O-ring (U.S. Pat. No. 2,456,356). Backup rings are also found with cross sections in the form of a truncated rectangle which mates with the sloped side of the groove (U.S. Pat. No. 2,462,586). The backup rings may be endless or continuous (uncut) in which case they may be difficult to emplace in a groove on the sleeve without distorting the ring beyond its elastic limits.

For ease of installation on the valve sleeve the backup ring may be scarf cut (U.S. Pat. No. 2,462,586) to permit it to pass over intervening lands on the sleeve. The backup ring may also be made in expandable helical form with more than one circumferential loop (U.S. Pat. No. 2,749,193). The cross-sectional shape of these helical loop backup rings when emplaced in the groove is usually in the form of a square or rectangle adjacent the O-ring.

The cross section of the circumferential groove in the sleeve has usually been rectangular, (U.S. Pat. No. 2,456,356), however, some patents (U.S. Pat. Nos. 2,437,814 and 2,462,586) disclosed grooves with trapezoidal cross sections with the longer base opening outward. In another patent the trapezoidal groove had the longer base toward the inside of the groove (U.S. Pat. No. 2,427,787).

The O-ring is usually in the shape of a torus (U.S. Pat. Nos. 2,456,356 and 2,747,954) with a circular cross section, however, some sealing rings have a T-shape (U.S. Pat. No. 2,349,170) or an elliptical shape (U.S. Pat. No. 3,455,566) cross section.

Some of the failures of the prior art seals have been attributed to the short life of O-rings. This short operating life is in part due to damage caused during installation to the backup rings which protect the O-ring. This damage is a result of the stretching or deformation of the backup rings beyond their elastic limits in the process of installing them over the lands on the sleeve in order to install them in the groove. When the backup ring breaks down it permits the O-ring to be extruded into the annular space between the sleeve and the surrounding valve body. The elastomeric O-ring may also be damaged by chafing against a sharp edge on the backup ring where the ring is scarf cut, by chafing against the end of the backup ring helix or chafing against a sharp edge of the circumferential groove. Seal failures may also result from installing rings in improper sequence on the sleeve or by reason of installation of the O-ring or the backup ring facing in the incorrect direction.

SUMMARY OF THE INVENTION

The present invention is directed to overcoming some of the deficiencies of the prior art seals and at the same time providing a space efficient seal configuration which uses an endless or continuous (uncut) toroidal backup ring of Teflon or Teflon-filled material. These solid or continuous backup rings have the longest operating life of the various types of backup rings and have the least deleterious effect on the O-rings. These backup rings are used in conjunction with a specially configured groove and sleeve to prevent distortion beyond their elastic limit during installation. The backup ring in the inventive seal is installed on the low pressure side of the elastomeric O-ring in a unidirectional seal or on both sides of the elastomeric O-ring in a bidirectional seal.

The solid or continuous elastomeric O-ring like the backup rings as noted above is also in a toroidal shape but has a smaller internal diameter and a larger cross-sectional area than the backup ring. Because of the symmetrical toroidal shape of both the elastomeric O-ring and the backup rings they are not susceptible to improper installation due to facing in the wrong direction in the groove. Twisting of the toroidal shaped ring does not change its circular cross section. The backup ring presents a flat surface which abuts the O-ring when the ring is installed in position in the groove. Because of the difference in the inside diameter of the backup rings and the elastomeric rings they cannot be placed in the wrong sequence in the groove on the sleeve.

In a bidirectional seal when backup rings are installed on both sides of the elastomeric O-ring the gland cross section is six-sided in the form of a truncated trapezoid. The groove at its deepest point has a flat bottom parallel to the axis of the sleeve and has a 30° ramp angle on both ends. The backup rings are installed on the ramp so that they are located on either side of the elastomeric seal. Due to the truncation of the groove a step is formed which prevents the backup ring from being forced into the annular gap between the sleeve and overlying valve body.

In the unidirectional seal a single continuous toroidal shaped backup ring is installed on the low pressure side of the elastomeric O-ring. The gland cross section is five-sided in the form of a truncated rectangle. The groove at its deepest point has a flat bottom parallel to the axis of the sleeve and has a 30° ramp on the low pressure side. The elastomeric O-ring is installed on the flat bottom surface and the backup ring is installed on the ramp between the O-ring and the low pressure edge of the groove.

The toroidal shaped backup rings having a large inside diameter and a small cross-sectional area are easier to install over the intervening lands on the sleeve. The undercutting of the sleeve adjacent to the lands also assists in installation of the backup rings without undue stretching of the rings or need to use other special tools for installation.

An additional advantage of inventive seal over conventional seals with square cut circumferential grooves is that under pressure the O-ring is forced up the conical surface and compressed tighter by a wedging action between the sleeve and overlying valve body.

DESCRIPTION OF PREFERRED EMBODIMENT

Figure 1:
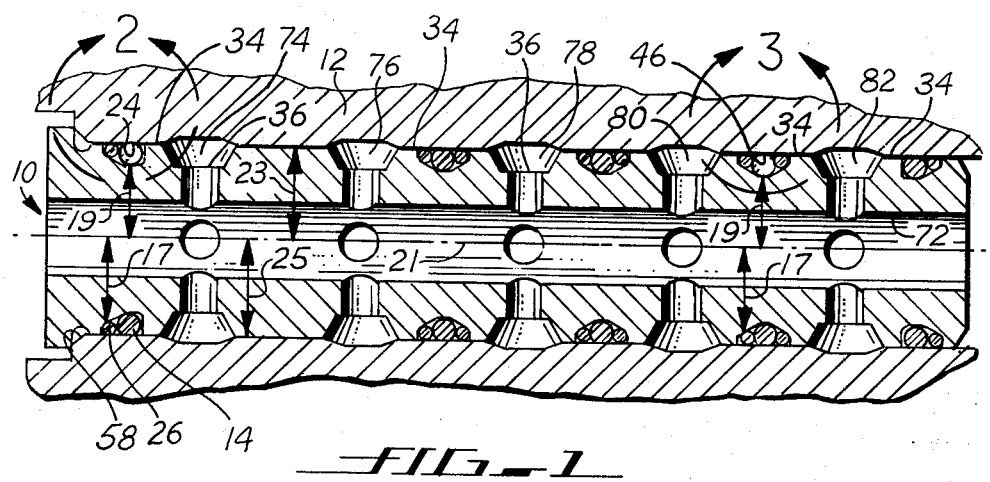
FIG. 1 is a section drawing through a sleeve and valve body.

In FIG. 1, a sectional view of a sleeve 10 mounted inside a valve body 12, several seal configurations are shown. The sleeve portion of the seal configuration designated by the circle 2 in FIG. 1 is enlarged in FIG. 2. In this configuration an O-ring 14 is mounted in a circumferential four-sided groove 16 in the sleeve 10. The O-ring 14 is of elastomeric material in the form of a solid torus with a circular cross section 18. The O-ring 14 is mounted in the deepest portion of the groove 16 on the flat surface 20. The flat surface 20 is parallel to the axis 21 of the cylindrical sleeve 10. The cross-sectional diameter 22 of the O-ring 18 is slightly greater than the distance from the flat bottom 20 of the groove 16 to the opposing wall 24 (FIG. 1) of the overlying valve body 12. On the low pressure side of the O-ring 14 is a solid toroidal shaped backup ring 26 with a circular cross section 28. The inside radius 17 (FIG. 1) of the backup ring 26 is greater than the inside radius 19 of the O-ring 14 permitting the backup ring 26 to be mounted on a 30° conical ramp 30 in the groove 16. The outside radius of the backup ring 26 should be approximately equal to the radius 23 of the sleeve 10 but in no event greater than the inside radius 25 of the valve body 12. The backup ring 26 is made of a highly wear resistant material with low coefficient friction such as Teflon or Teflon-filled materials. The sides of 27 and 29 of the groove 16 are perpendicular to the axis 21 of the cylindrical sleeve 10.

The length of edge 27 of the groove 16 is slightly smaller than the diameter 32 of the cross section 28 of the backup ring 26. The diameter 32 of the cross section 28 of the backup ring 26 is approximately one-half the diameter 22 of the cross section 18 of the elastomeric O-ring 14. The lands 34 (FIG. 1) on the sleeve 10 adjacent the seal are kept to a minimum length sufficient to provide bearing support for the sleeve 10 in the valve body 12. The non-seal portion 36 of the sleeve 10 adjacent to the lands 34 is undercut to at least the maximum depth of the groove 16. This permits the sliding of the solid Teflon ring 26 over a land and into the undercut portion of the sleeve moving it along the sleeve 10 for positioning in a groove 16.

Figure 3:
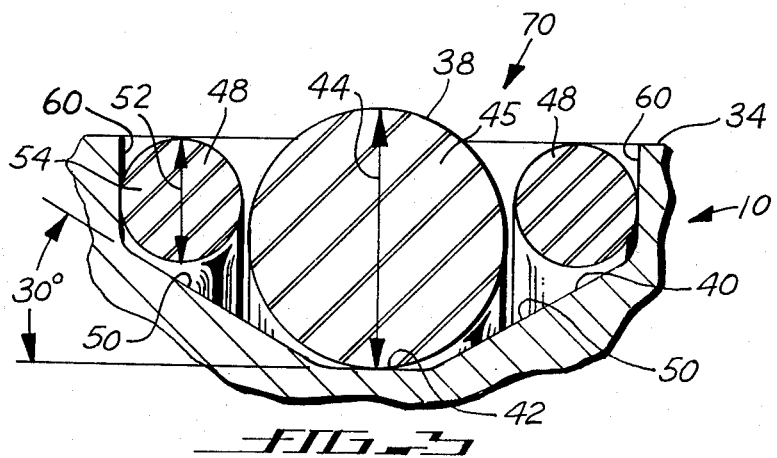
FIG. 3 is an enlargement of the sleeve portion of circle 3 with the O-ring and backup rings in the circumferential groove prior to insertion of the sleeve into the surrounding valve body.

In the bidirectional seal, the sleeve portion of which is shown in FIG. 3, a toroidal shaped elastomeric O-ring 38 is mounted in the deepest portion of the five-sided circumferential groove 40 on its flat bottom 42. The flat bottom 42 is parallel to the axis of the cylindrical sleeve 21. The diameter 44 of the cross section 45 of the O-ring 38 is slightly greater than the distance between the flat bottom 42 and the opposing wall 46 (FIG. 1) of overlying valve body 12. The diameter 52 of the cross section 54 of backup ring 48 is approximately one-half the diameter 44 of the cross section 45 of the O-ring 38. The sides 60 of groove 40 are perpendicular to axis 21 of the cylindrical sleeve 10.

The two backup rings 48 on each side of the O-ring 38 are mounted on symmetrical 30° conical ramps 50 to the flat bottom 42 of the circumferential groove 40. These ramps 50 are truncated by the sides 60 of the groove 40 such that the diameter 52 of the cross section 54 of the backup ring 48 is slightly larger than the length of side 60. The backup rings 48 are mounted within the groove 40 between the O-ring and the edges 60 of the groove 40.

Figure 2:
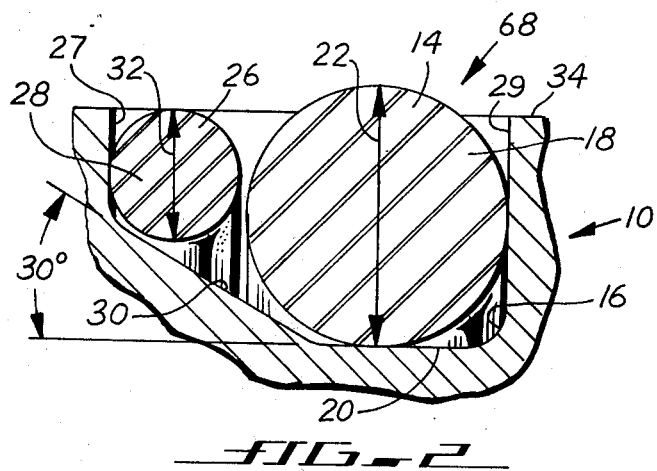
FIG. 2 is an enlargement of the sleeve portion of circle 2 with the O-ring and backup ring in the circumferential groove prior to insertion of the sleeve into the surrounding valve body.

To assemble the improved seal 68 of FIG. 2 the sleeve 10 is removed from the valve body 12. The backup ring 26 is then mounted from the small or right hand end of the sleeve 10 (FIG. 1). The backup ring 26 can be slipped over the lands 34 and into the undercut portions 36 of the sleeve and eventually into the correct groove 16. Once the backup ring 26 is positioned on the ramp 30 in the groove 16 on the sleeve 10, the O-ring seal 14 is moved along the sleeve 10 from the right hand end (FIG. 1) and placed on the high pressure side of the groove 16 as shown in FIG. 2. The placement of the O-ring 14 in the groove 16 forces the backup ring 26 up the conical ramp 30 against the perpendicular edge 27 of the groove 16.

To assemble the improved multidirectional seal 70 as shown in FIG. 3 two backup rings 48 are moved along the sleeve 10 from its smaller or right hand end (FIG. 1) over the lands 34 and along the undercut portions 36 of the sleeve 10 until they are positioned in the groove 40 of FIG. 3. Once those backup rings 48 are in position in the groove 40, the elastomeric O-ring 38 is moved along the sleeve 10 from the smaller right hand end (FIG. 1) and positioned between the two backup rings 48 such that they are forced up the ramps 50 and are against the perpendicular edge 60 of the groove 40. When all the backup rings and O-rings are in the grooves on the sleeve 10 the sleeve 10 is placed within the valve body 12. To ease the insertion of the sleeve 10 in the valve body 12 the edge of the opening in the valve body 10 may be chamfered producing a bevelled edge 58 on the left hand end of the valve body 10 (FIG. 1).

A slide member is normally inserted in the bore of sleeve 10 to control the flow between the various chambers 74, 76, 78, 80 and 82 defined by the sleeve 10 and surrounding valve body 12. This slide member has been omitted for purposes of clarity.

When hydraulic or pneumatic fluid is forced into the slide member and into the interior of the sleeve 10 and out through the various orifices to the sleeve 10, the hydraulic fluid travels along the annular gap between the sleeve 10 and valve body 12. In the unidirectional seal 68 the fluid forces the elastomeric O-ring 14 up the ramp 30 in the groove 16 and against the backup ring 26. This movement of the O-ring 14 results in the O-ring being further compressed by the wedging action of the ramp 30 and opposing side 24 the valve body 12.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. An improved seal to close the annular space between an inside cylindrical sleeve and a surrounding valve comprising:
   a circumferential groove on said sleeve facing outward toward said valve, said groove having two edges perpendicular to said axis of said sleeve, said groove having a flat bottom surface parallel to the axis of the sleeve at its deepest portion and said groove having at least one enlarged conical surface extending from the flat bottom of said groove to an edge of said groove, said conical surface defining a transitional surface between the bottom of said groove and the edge of said groove;
   a solid toroidal shaped elastomeric ring mounted on said flat surface of said circumferential groove on said inside cylindrical sleeve, said ring having an inside diameter which requires mounting of said O-ring on the flat bottom surface of said groove, the cross section of said O-ring of sufficient size to be compressed between the flat bottom surface of the groove and the opposing side of the valve;
   a solid toroidal shaped backup ring mounted on said conical surface of said circumferential groove on said inside cylindrical sleeve, said ring having an internal diameter permitting mounting said ring on said conical surface of said groove, said backup ring having a cross-sectional area sufficient to prevent the O-ring from being extruded into said annular space when pressure is applied to the seal.

2. The seal of claim 1 wherein the conical surface is formed by a ramp angled at approximately 30° to the flat bottom surface of the groove.

3. The seal of claim 2 wherein the diameter of cross section of the backup ring is approximately one-half the diameter of the cross section of the O-ring.

4. Seal of claim 1 wherein the groove has two conical surfaces on each side of the flat bottom surface of the groove and a toroidal shaped backup ring located within the groove surrounding conical surface on each side of the O-ring.

5. Seal of claim 4 wherein the conical surfaces are formed by ramps angled at approximately 30° to the flat bottom surface of the groove.

6. The seal of claim 5 wherein the diameter of the cross section of the backup ring is approximately one-half the diameter of the cross section of the O-ring.

7. Seal of claim 6 wherein the lands located along the sleeve adjacent the grooves have minimum length to provide support for said sleeve in said valve.

8. A seal of claim 7 wherein the sleeve member is undercut in areas not required for sealing and areas not required to support said sleeve within said valve to a depth of at least the maximum depth of the circumferential groove.

9. An unidirectional annular seal to close off the presurized fluid in an annular space between an inside cylindrical surface of a sleeve and a surrounding valve body comprising:
   a four-sided circumferential groove in said cylindrical surface the two edges of which are perpendicular to the axis of said cylindrical surface of said sleeve, said groove at its deepest portion having a flat bottom surface parallel to the axis of said cylindrical surface of the sleeve and a conical surface defined by a ramp angled from said flat bottom surface to the low pressure edge of said groove;
   a continuous elastomeric toroidal shaped O-ring mounted on the flat bottom in said four-sided circumferential groove on said sleeve, the inside diameter of said O-ring the inside diameter requires mounting of the O-ring on the flat bottom surface of the groove, the circular cross section of said O-ring being compressed between the flat bottom of said groove and the opposing side of the surrounding valve body; and
   a solid continuous toroidal shaped backup ring mounted on the conical surface in said four-sided circumferential groove in said sleeve, said ring having an inside diameter larger than the inside diameter of said O-ring permitting mounting of said backup ring on the conical surface in said groove, said backup ring having a circular cross section of sufficient size when mounted on the low pressure side of said O-ring to prevent the O-ring from being extruded into said annular space.

10. An bidirectional annular seal to close off pressurized fluid in an annular space between an inside cylindrical surface of a sleeve and a surrounding valve body comprising:
    a five-sided circumferential groove in said cylindrical surface having two edges which are perpendicular to axis of said cylindrical surface of said sleeve, said groove having a flat bottom parallel to said axis of said cylindrical surface of said sleeve at the deepest portion of the groove and two conical surface defining ramps angled from said flat bottom to said edges of said groove;
    a solid continuous elastomeric toroidal shaped O-ring mounted on flat bottom of said five-sided circumferential groove of said sleeve, said O-ring having an inside diameter of such size to require mounting of said O-ring on the flat bottom surface of said groove, the circular cross section of said O-ring being compressed between the flat bottom of said groove and the opposing side of said overlying valve body;
    and two solid continuous toroidal shaped backup rings one mounted on each of the conical surfaces of said five-sided circumferential groove of said sleeve, said backup ring having inside diameters larger than the inside diameter of said O-ring permitting mounting of said backup rings on said conical surfaces in said groove on opposite sides of said O-ring, said backup rings having circular cross sections of sufficient size when mounted on the sides of the O-ring to prevent said O-ring from being extruded into said annular space.

11. Seal of claim 3 wherein the lands located along the sleeve adjacent the grooves have minimum length to provide support for said sleeve in said valve.

12. A seal of claim 11 wherein the sleeve member is undercut in areas not required for sealing and areas not required to support said sleeve within said valve to a depth of at least the maximum depth of the circumferential groove.

* * * * *